United States Patent
Chandrasekaran et al.

(10) Patent No.: US 8,458,896 B2
(45) Date of Patent: Jun. 11, 2013

(54) ROBOTIC END-EFFECTOR FOR COMPONENT CENTER ALIGNMENT AND ASSEMBLY

(75) Inventors: Nagappan Chandrasekaran, Singapore (SG); Ching Keat Tay, Singapore (SG); Qihong Wang, Singapore (SG)

(73) Assignee: HGST Netherlands B.V., Amsterdam (NL)

( * ) Notice: Subject to any disclaimer, the term of this patent is extended or adjusted under 35 U.S.C. 154(b) by 385 days.

(21) Appl. No.: 12/277,762

(22) Filed: Nov. 25, 2008

(65) Prior Publication Data

US 2010/0128389 A1   May 27, 2010

(51) Int. Cl.
  *B23P 19/00*    (2006.01)
  *H05K 3/30*    (2006.01)
(52) U.S. Cl.
  USPC ............................. 29/739; 29/729; 29/834
(58) Field of Classification Search
  USPC .................. 29/729, 834, 737, 739; 414/737, 414/752, 795.2; 901/15, 16, 27, 30, 31, 32, 901/38, 39
  See application file for complete search history.

(56) References Cited

U.S. PATENT DOCUMENTS

| | | | | |
|---|---|---|---|---|
| 4,910,859 A | * | 3/1990 | Holcomb | 29/564.2 |
| 5,089,922 A | * | 2/1992 | LeClair | 360/99.08 |
| 5,403,056 A | * | 4/1995 | Wallace | 294/98.1 |
| 5,927,934 A | * | 7/1999 | Dadiomov | 414/729 |
| 6,462,902 B1 | * | 10/2002 | Luo et al. | 360/99.12 |
| 6,603,634 B1 | * | 8/2003 | Wood et al. | 360/98.08 |
| 6,848,168 B1 | * | 2/2005 | Slife et al. | 29/603.03 |
| 6,877,215 B2 | * | 4/2005 | Pfeiffer | 29/729 |
| 6,884,313 B2 | * | 4/2005 | Liu et al. | 156/292 |

(Continued)

FOREIGN PATENT DOCUMENTS

| | | |
|---|---|---|
| WO | WO-02/29814 | 4/2002 |
| WO | WO0229814 * | 4/2002 |

OTHER PUBLICATIONS

Jintanawan, et al., "Finite Element Analysis of Disk-Spindle Vibration in Hard Disk Drives", *Department of Mechanical Engineering*, Chulalongkorn University. http://lecturer.eng.chula.ac.th/fmetij/index_files/MM152.pdf, 4 pages.

(Continued)

*Primary Examiner* — David Angwin (57) ABSTRACT

A robotic end-effector for high-speed precision alignment and assembly of of a spacer ring onto a motor-hub assembly has a holding device operable for temporarily holding the spacer ring. The spacer ring is to be aligned and assembled to the motor-hub assembly. The robotic end-effector has a course alignment device operable for locating the holding device with respect to a locating feature that is coupled with the motor-hub assembly. The robotic end-effector has a retractor operable for disengaging the course alignment device from the locating feature. The robotic end-effector has a moveable base whereby lateral compliance is provided for the holding device, enabling motion of the spacer ring with respect to the motor-hub assembly, thereby enabling fine alignment of the spacer ring with the motor-hub assembly when the spacer ring touches the motor-hub assembly.

6 Claims, 9 Drawing Sheets

U.S. PATENT DOCUMENTS

| | | | |
|---|---|---|---|
| 7,032,232 B2 * | 4/2006 | Russ | 720/719 |
| 7,294,393 B2 * | 11/2007 | Murai et al. | 428/306.6 |
| 7,397,000 B2 * | 7/2008 | Shimoto et al. | 174/258 |
| 7,490,398 B1 * | 2/2009 | Klassen et al. | 29/603.04 |
| 2003/0044267 A1 * | 3/2003 | Pfeiffer et al. | 414/788.1 |
| 2004/0100725 A1 * | 5/2004 | Chen et al. | 360/98.08 |
| 2006/0043750 A1 * | 3/2006 | Wirth | 294/103.1 |
| 2006/0139800 A1 * | 6/2006 | Takahashi | 360/99.12 |
| 2009/0292298 A1 * | 11/2009 | Lin et al. | 606/130 |

OTHER PUBLICATIONS

XBOARD.US, "What's Inside a Hard Drive?", http://www.xboard.us/showthread.php?t=6304, (Feb. 22, 2005), 3 pages.

Frech, et al., "Measuring to the Limits", *Polytec LM Info. Special* http://www.polytec.com/eur/_files/LM_INFO_Special_2004_2_E(1).pdf, (Feb. 2004), 30 pages.

* cited by examiner

ROBOTIC END-EFFECTOR FOR COMPONENT CENTER ALIGNMENT AND ASSEMBLY

TECHNICAL FIELD

This invention relates generally to the field of robotic assembly and in particular to high-speed precision robotic alignment and assembly.

BACKGROUND

Robotic assembly of components has become prevalent in most manufacturing operations across many diverse industries. Robots can assemble components quickly and accurately, saving a manufacturer time and money. The primary interface of a robot with a component to be assembled is what is known in the art as an end-effector. An end-effector enables the robot to grip the component to be assembled, position the component with other components or assemblies, and couple the component to other components or assemblies.

A challenge for a user and designer of robotic end-effectors is to enable a robot to align and assemble components with sufficient dexterity and finesse so as to avoid damaging the component that it is to assemble, while maintaining the robot's speed and accuracy. There exist vision systems and tactile feedback systems adapted for robotic applications with which the position of a component being handled by an end-effector can be detected and the force at which it is being moved or positioned is controlled. Such systems can add cost and complexity to a robotic system and can slow the assembly process being performed by the robotic system.

SUMMARY OF THE INVENTION

Various embodiments of the present invention are described herein. A robotic end-effector for high-speed precision alignment and assembly of components has a holding device operable for temporarily holding a second component. The second component is to be aligned and assembled to a first component. The robotic end-effector has a course alignment device operable for locating the holding device with respect to a locating feature that is coupled with the first component. The robotic end-effector has a retractor operable for disengaging the course alignment device from the locating feature. The robotic end-effector has a moveable base whereby lateral compliance is provided for the holding device, enabling motion of the second component with respect to the first component, thereby enabling fine alignment of the second component with the first component when the second component touches the first component.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of embodiments of the present invention, numerous specific details are set forth in order to provide a thorough understanding of the present invention. However, it will be recognized by one of ordinary skill in the art that embodiments of the present invention may be practiced without these specific details. In other instances, well known methods, procedures, and components have not been described in detail as not to unnecessarily obscure aspects of the present invention.

The discussion will begin with a description and overview of the robotic end-effector and its operation. The discussion will then focus on embodiments of the present invention for a robotic end-effector by which damage to components upon assembly is mitigated without reducing assembly time or incurring added equipment cost.

Overview

High speed, precision, and low cost assembly are goals for many manufacturers of mechanical devices. Manufacturers have relied upon robotic assembly for decades to achieve these goals. Robotic assembly has been applied to a wide variety of mechanical devices. Many of these applications involve the assembly of small precision devices, which require high degrees of accuracy and finesse. As these devices become smaller, more fragile, with tighter tolerances, the challenge of meeting the goals of high-speed, precision, and low cost assembly become more challenging.

Some examples of mechanical devices that require a high degree of precision, wherein robotic assembly is applied are: small motors, such as those found in CD players, camcorders, and quartz watch movements; pneumatic engines, such as those found in dental drills; analog watch movements; and hard disk drives. An assembly procedure common to these examples that is challenging for a robot is to align and assemble a second component to a first component, for example: an armature into stator for a motor; a shaft into a hole for a pneumatic engine or watch; and a spacer ring onto a motor-hub assembly for a hard disk drive. The nature of these mechanical devices requires precision alignment and assembly. It is desirable for the manufacturers of such mechanical devices to perform the required precision alignment and assembly with high speed and low cost.

The previous examples are not intended to be an all-inclusive or exhaustive list of robot-assembled mechanical devices requiring a high degree of accuracy. The previous examples demonstrate the common challenge of a robot to align and assemble a second component to a first component. For the sake of brevity and clarity only the hard disk drive will be discussed as an example of a mechanical device for which embodiments of the present invention enable a robot to align and assemble a second component to a first component without damaging the components and performing the alignment and assembly with high speed, accuracy, and without added cost.

Figure 1:
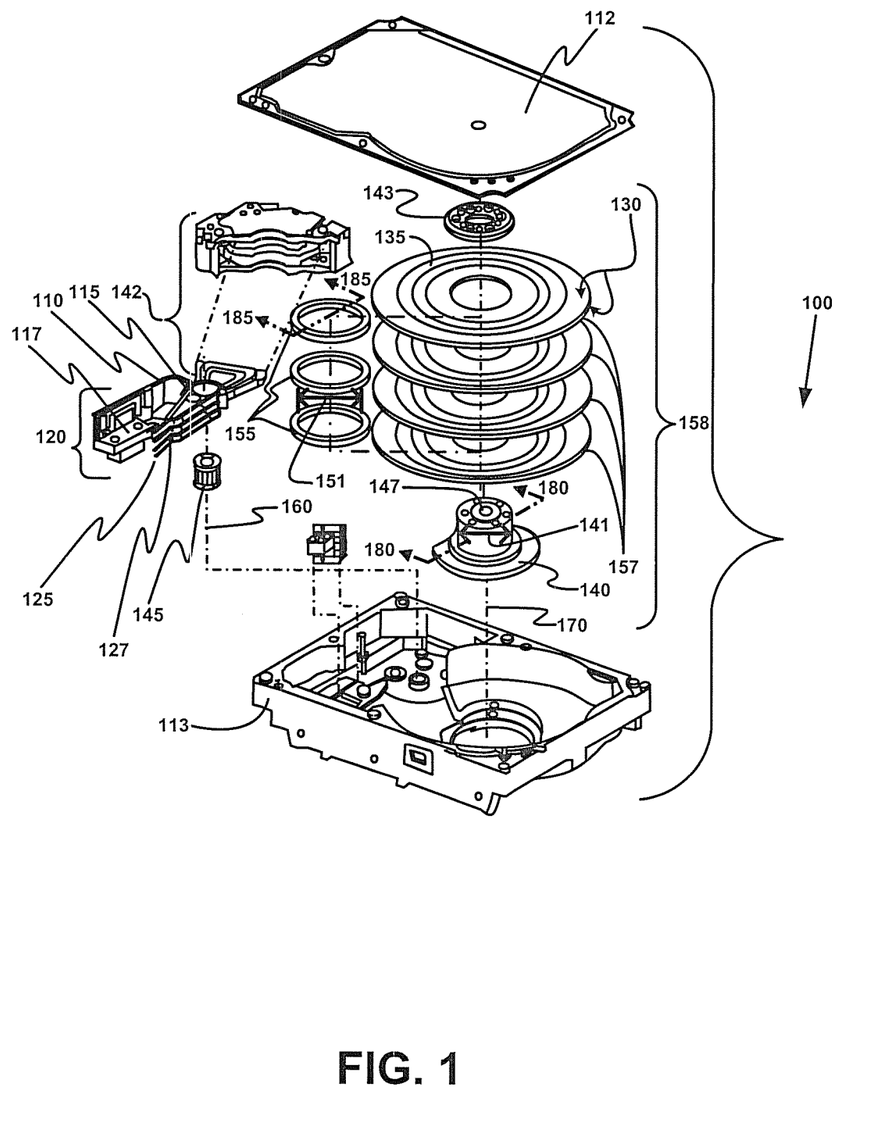
FIG. 1 is an isometric blow-apart of an HDD operable to embodiments of the present invention.

With reference to FIG. 1, an isometric blow-apart of HDD 100 is shown which is operable to embodiments of the present invention. Base casting 113 provides coupling points for components and sub-assemblies such as disk stack 158, voice coil motor (VCM) 142, and actuator assembly 120. Disk stack 158 is coupled to base casting 113 by means of motor-hub assembly 140. Disk stack 158 comprises: motor-hub assembly 140, which has at least one disk 157 coupled to it; at least one spacer ring 155 for separating adjacent disks 157; and disk clamp 143 for securing disks 157 and spacer ring 155 to motor-hub assembly 140. Disk 157 has at least one surface 130 upon which reside data tracks 135. Disk 157 is coupled to motor-hub assembly 140 whereby disk 157 can rotate about an axis common to motor-hub assembly 140 and the center of disk 157.

Actuator assembly 120 comprises suspension 127, which suspends hard disk drive slider 125 next to disk surface 130, and connector 117, which conveys data between arm electronics (A/E) 115 and a host system wherein HDD 100 resides. Flex-cable 110, which is part of actuator assembly 120, conveys data between connector 117 and A/E 115. Actuator assembly 120 is coupled pivotally to base casting 113 by means of pivot bearing 145, whereby VCM 142 can move HDD slider 125 arcuately across data tracks 135. Upon coupling of actuator assembly 120, disk stack 158, VCM 142, and other components with base casting 113, cover 112 is coupled to base casting 113 to enclose these components and sub-assemblies into HDD 100.

Actuator assembly 120 and disk stack 158 are two sub-assemblies comprised within HDD 100 which are conducive to mechanized and robotic assembly techniques. Actuator assembly 120 and disk stack 158 are conducive to mechanized and robotic assembly techniques because their components are typically stacked about one central axis; axis 160 coinciding with actuator assembly 120, and axis 170 coinciding with disk stack 158.

The assembly of disk stack 158 exemplifies a challenge facing manufacturers using a robot to stack disk 157 and spacer ring 155 onto motor-hub assembly 140. For the sake of brevity and clarity, the discussion of embodiments of the present invention will focus on the example of robotic assembly of spacer ring 155, i.e. a second component, onto motor hub assembly 140, i.e. a first component.

Spacer ring 155 comprises inner diameter (ID) 151 which coincides upon assembly with outer diameter (OD) 141 of motor-hub assembly 140. OD 141 and ID 151 have dimensions and tolerances that assure motor-hub assembly 140 can be inserted into spacer ring 155 with a minimal amount of clearance between OD 141 and ID 151. It is appreciated that the close fit between OD 141 and ID 151 is desired to minimize any out of balance condition that can arise when motor-hub assembly 140 spins disk stack 158 at its operating rotational speed.

The use of the term insertion is intended to encompass both conditions of OD 141 of motor-hub assembly 140 being placed inside ID 151 of spacer ring 155 and ID 151 of spacer ring 155 being placed around OD 141 of motor-hub assembly 140.

One of the challenges of assembling spacer ring 155 onto motor-hub assembly 140 with a robot is to avoid damaging OD 141 of motor-hub assembly 140. A misalignment of ID 151 with OD 141 can scrape spacer ring 155 against OD 141 of motor-hub assembly 140. This can result in a burr being raised on OD 141 and possibly cause future problems. These problems can be one of several assembly and/or reliability concerns. Examples of these problems are as follows: A burr can become dislodged resulting in potential debris within HDD 100, which can result in several types of defects and failures such as, damaged data on data track 135, damage to pivot bearing 145, and head crash of HDD slider 125. A burr can remain on OD 141 and prevent the proper positioning of subsequent spacer ring 155 and/or disk 157. For reasons obvious to one who is accustomed to fabricating hard disk drives, disk stack 158 can be disassembled and reassembled during the manufacturing process of disk stack 158. A burr can hinder the reassembly process by interfering with the insertion of motor-hub assembly 140 into spacer ring 155 and/or disk 157.

The time allotted for placing spacer ring 155 onto motor-hub assembly 140 is typically 5 seconds or less. This is achieved by relying upon the accuracy and repeatability built into a robot to place spacer ring 155 onto motor-hub assembly 140. The repeatability of a typical robot to pick and place a small component such as spacer ring 155 is 5 to 10 microns. Although OD 141 of motor-hub assembly 140 and ID 151 of spacer ring 155 are designed to have as little as 4 micron clearance when they are coupled, the repeatability of placing OD 141 in tooling to receive spacer ring 155 can deviate from a nominal position by as much as 25 microns, which is due in part to the additive tolerances between locating feature 147 and OD 141 of components comprising motor-hub assembly 140.

Physical Description

Figure 2:
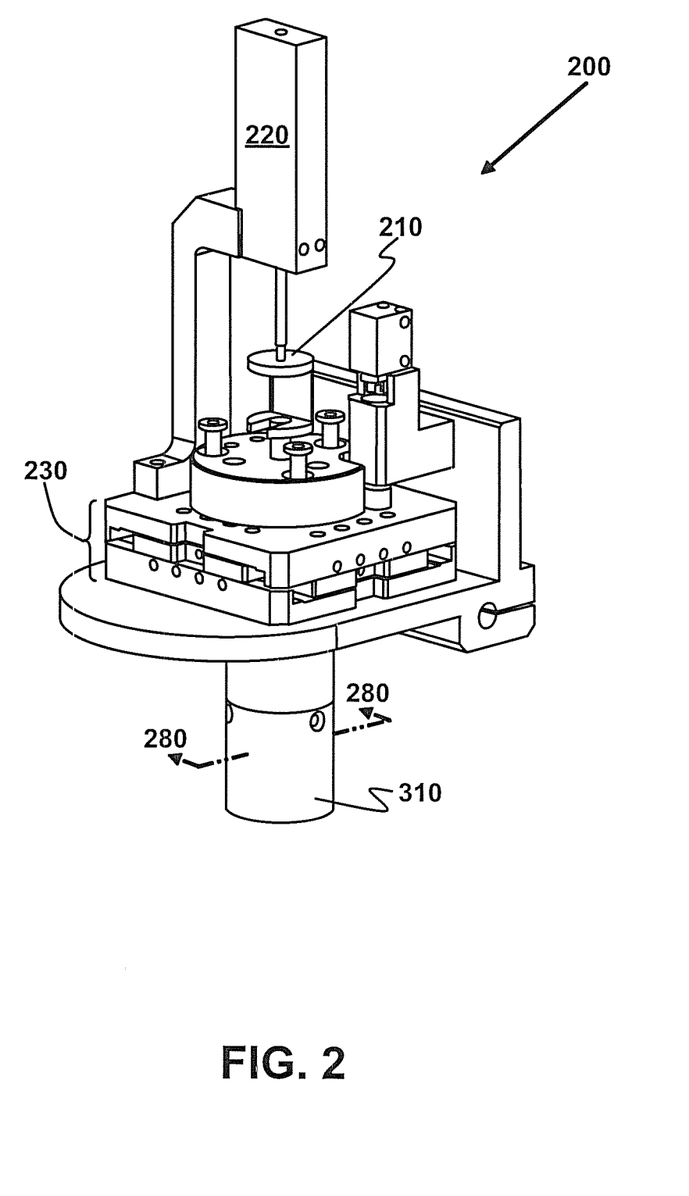
FIG. 2 is an isometric view of a robotic end-effector in accordance with one embodiment of the present invention.
Figure 3A:
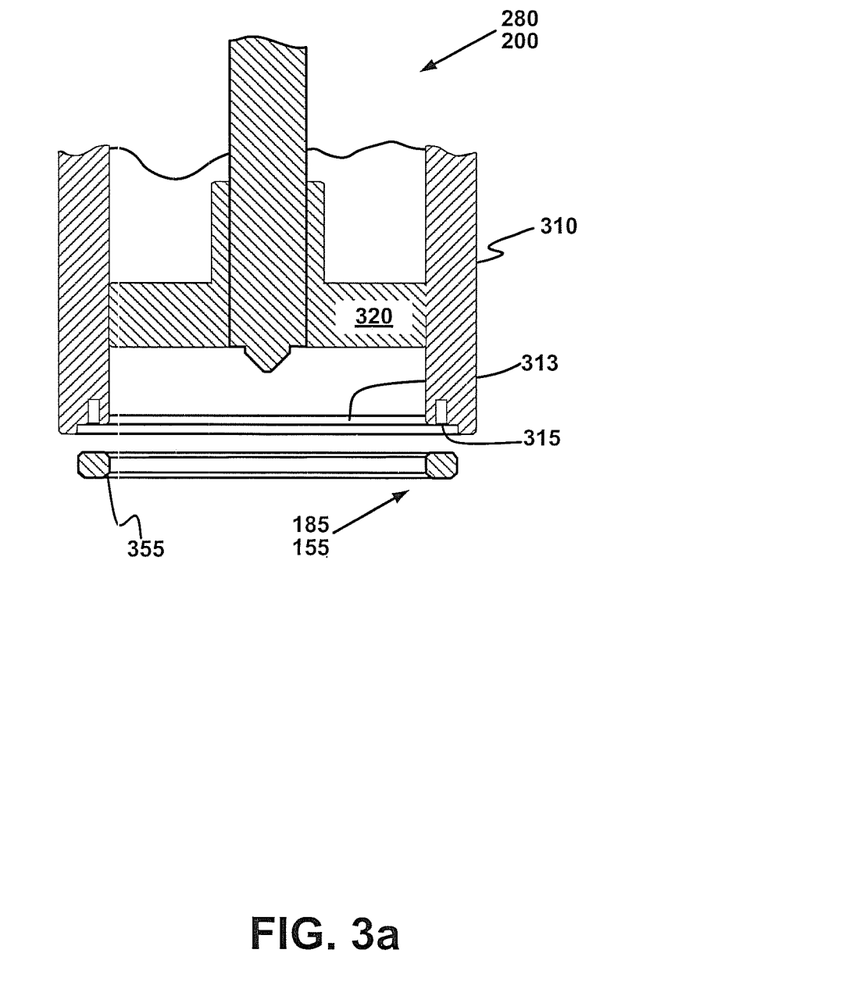
FIG. 3A through 3F are section views of a robotic end-effector, a motor-hub assembly, and a spacer ring during assembly in accordance with one embodiment of the present invention.
Figure 3B:
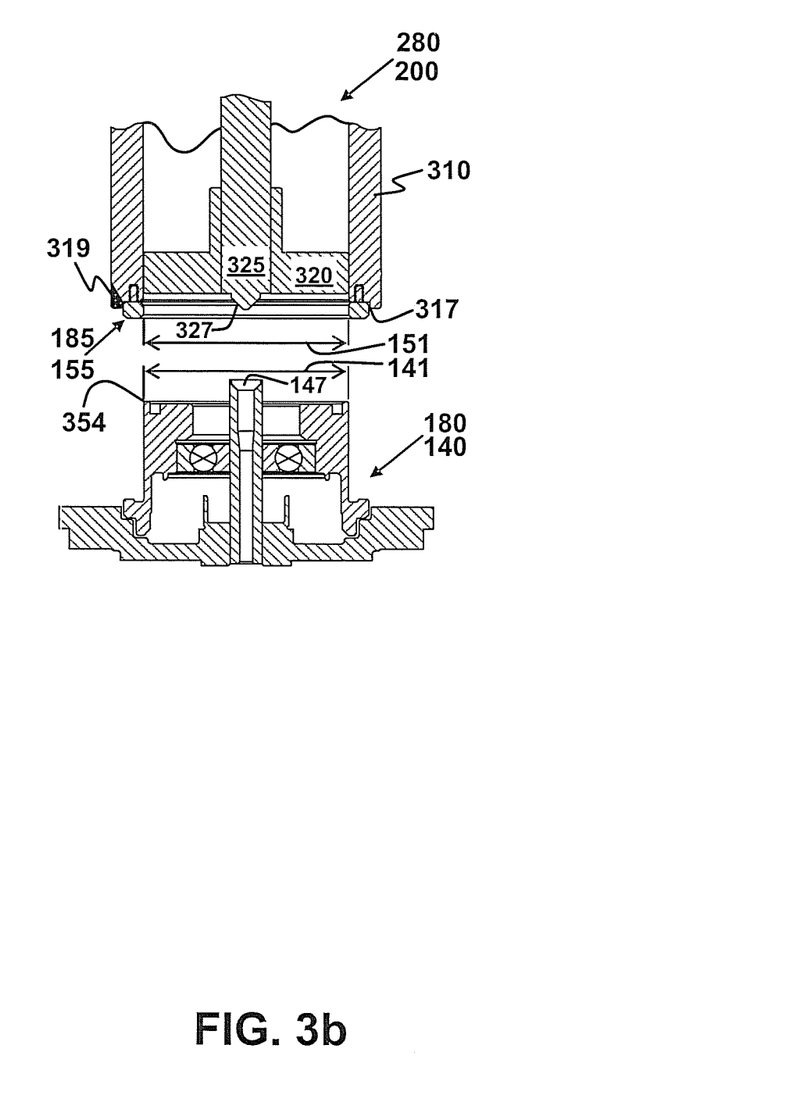

With reference to FIG. 2, an isometric view of robotic end-effector 200, such as a robotic end-effector operable in a disk stack station, is presented for high-speed precision alignment and assembly of components in accordance with one embodiment of the present invention. With reference to FIG. 3A and FIG. 3B, section 280 of robotic end-effector 200, section 180 of motor-hub assembly 140, and section 185 of spacer ring 155 during assembly are presented in accordance with one embodiment of the present invention.

Embodiments of the present invention are not limited by the robot to which robotic end-effector 200 is coupled. Examples of robots well known in the art that are enabled by embodiments of the present invention are SCARA (Selective Compliance Articulated Robot Arm), Cartesian, and gantry.

In accordance with an embodiment of the present invention, robotic end-effector 200 comprises holding device 310 which is operable for temporarily holding a second component, such as spacer ring 155, whereby the second component such as spacer ring 155 is to be aligned and assembled to a first component such as motor-hub assembly 140. Holding device 310 comprises datum feature 313 for abutting the second component, such as spacer ring 155 to holding device 310. In accordance with an embodiment of the present invention, holding device 310 comprises lateral datum feature 317 for abutting the second component, such as spacer ring 155 to holding device 310 in a lateral direction approximately coincident with the plane of spacer ring 155.

In accordance with an embodiment of the present invention, lateral datum feature 317 of holding device 310 comprises a surface approximately coincident with a circumference of the second component such as spacer ring 155. In so doing, the circumference of lateral datum feature 317 is of a size that enables clearance between a circumference of the second component such as spacer ring 155 and lateral datum feature 317.

In accordance with an embodiment of the present invention, robotic end-effector 200 comprises holding device 310 having a vacuum port 315 for temporarily holding the second component, such as spacer ring 155 to robotic end-effector 200. Vacuum port 315 is contained within datum feature 313. In accordance with another embodiment of the present invention, holding device 310 has gripper 319, which comprises a movable section of lateral datum feature 317 whereby the second component, such as spacer ring 155, is biased and held against datum feature 313 and lateral datum feature 317.

In accordance with an embodiment of the present invention, robotic end-effector 200 comprises course alignment device 320 operable for locating holding device 310 with respect to locating feature 147 coupled with the first component such as motor-hub assembly 140. Course alignment device 320 comprise pin 325 having tapered end 327 which is configured to couple with locating feature 147 coupled with the first component such as motor-hub assembly 140. In one embodiment locating feature 147 is part of motor-hub assembly 140. In another embodiment, locating feature 147 is coupled with the first component such as motor-hub assembly 140 through a processing tray wherein the processing tray comprises locating feature 147 and the first component such as motor-hub assembly 140 is accurately coupled to the processing tray.

In accordance with an embodiment of the present invention, robotic end-effector 200 comprises retractor 210 that is operable for disengaging course alignment device 320 from locating feature 147. Retractor 210 comprises linear drive mechanism 220. Linear drive mechanism 220 is chosen from the group of linear drive mechanisms consisting of: a lead screw, a solenoid, a pneumatic piston, and a hydraulic piston.

In accordance with an embodiment of the present invention, robotic end-effector comprises moveable base 230 whereby lateral compliance is provided for holding device 310, enabling motion of the second component, such as spacer ring 155 with respect to the first component, such as motor-hub assembly 140, thereby enabling fine alignment of the second component with the first component when the second component touches the first component. Moveable base 230 comprises a low friction slide, such as a moveable stage used commonly in a microscope x-y stage.

Operation

Figure 4:
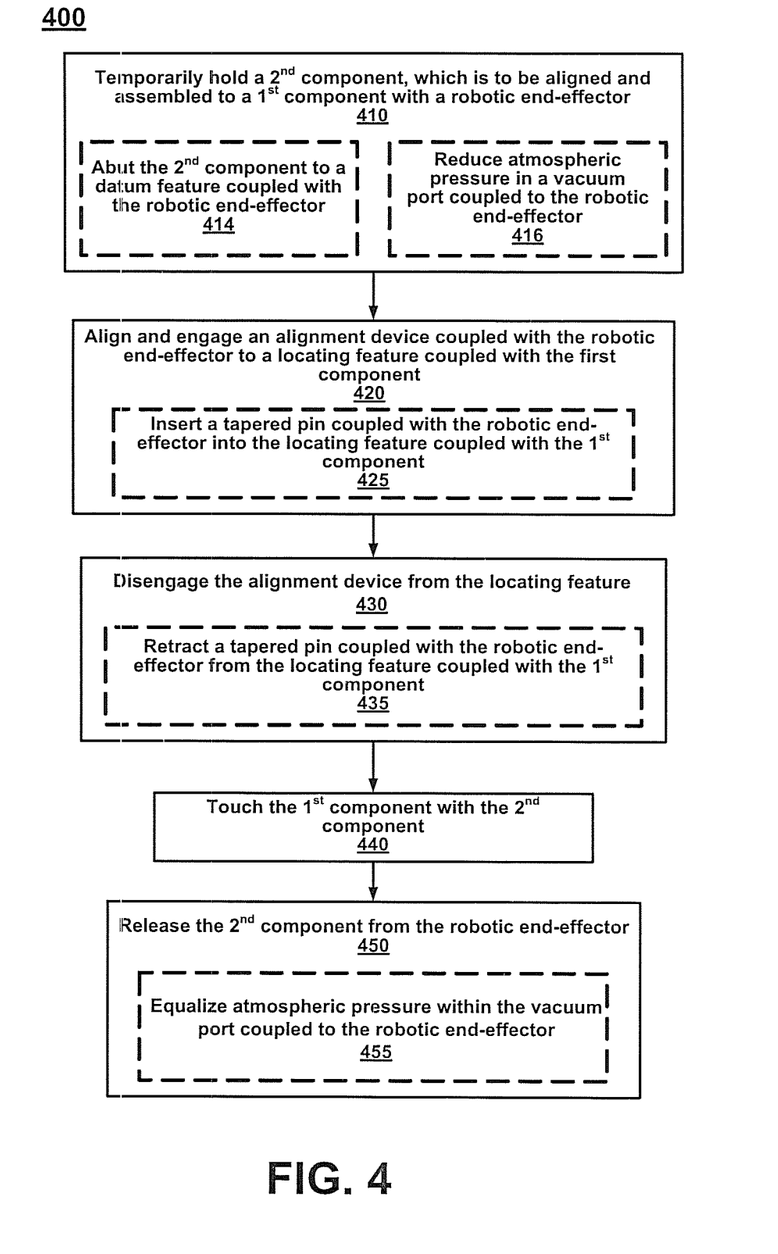
FIG. 4 is a flow chart illustrating a process for aligning and assembling components with a robotic end-effector in accordance with one embodiment of the present invention.

FIG. 4 is a flow chart illustrating a process 400 for aligning and assembling components with a robotic end-effector in accordance with an embodiment of the present invention. Embodiments of the present invention can be used for assembling any components, but are most beneficial to components that require high-speed precision alignment and finesse. Embodiments of the present invention enable high-speed precision alignment and assembly while avoiding the typical added cost of a vision system and/or a tactile feedback system that would normally be required to avoid damaging fragile precision components.

It is appreciated that vision systems and tactile feedback systems can improve a robotic system's precision and finesse. Vision systems and tactile feedback systems are also known to require added hardware and software that can penalize the speed of a robotic system and add cost.

In one embodiment, processors and electrical components under the control of computer readable and computer executable instructions carry out process 400. The computer readable and computer executable instructions reside, for example, in data storage features such as computer usable volatile and non-volatile memory. However, the computer readable and computer executable instructions may reside in any type of computer readable medium. Although specific components are disclosed in process 400, such components are examples of components for carrying out process 400. That is, the embodiments of the present invention are well suited to performing various other components or variations of the components recited in FIG. 4. Within the present embodiment, it is appreciated that the components of process 400 may be performed by software, by hardware, by an assembly mechanism, through human interaction, or by any combination of software, hardware, assembly mechanism, and human interaction.

Process 400 will be described with reference to elements shown in FIG. 1, FIG. 2, and FIG. 3A through FIG. 3F.

Prior to the start of process 400, a first component such as motor-hub assembly 140, and a second component such as spacer ring 155 are introduced into process 400. Process 400 is not limited by techniques for introducing components into a process. For example: A first component such as motor-hub assembly 140 is picked from a container by an operator or by another robot and placed into a fixture within process 400. A first component such as motor-hub assembly 140 is transferred by conveyer into process 400 as part of a larger assembly process such as an assembly process for assembling HDD 100. A first component such as motor-hub assembly 140 is already assembled into base casting 113 and is picked from a container by an operator or by another robot and placed into a fixture within process 400. A second component such as spacer ring 155 is picked from a tray by an operator or by another robot and is place onto holding device 310 of robotic end-effector 200.

In accordance with an embodiment as shown at element 410 of process 400, and in FIG. 3A and FIG. 3B, a second component such as spacer ring 155, which is to be aligned and assembled to a first component such as motor-hub assembly 140, is temporarily held by robotic end-effector 200. The transitory holding of the second component is required for accomplishing the aligning and assembling of components as presented in process 400.

In accordance with an embodiment as shown at element 414 of process 400 and in FIG. 3B, temporarily holding the second component such as spacer ring 155, further comprises abutting the second component to datum feature 313 coupled with robotic end-effector 200. In accordance with an embodiment holding the second component comprises abutting the second component, such as spacer ring 155, to lateral datum feature 317 to hold the second component in a lateral direction approximately coincident with the plane of spacer ring 155.

Figure 3C:
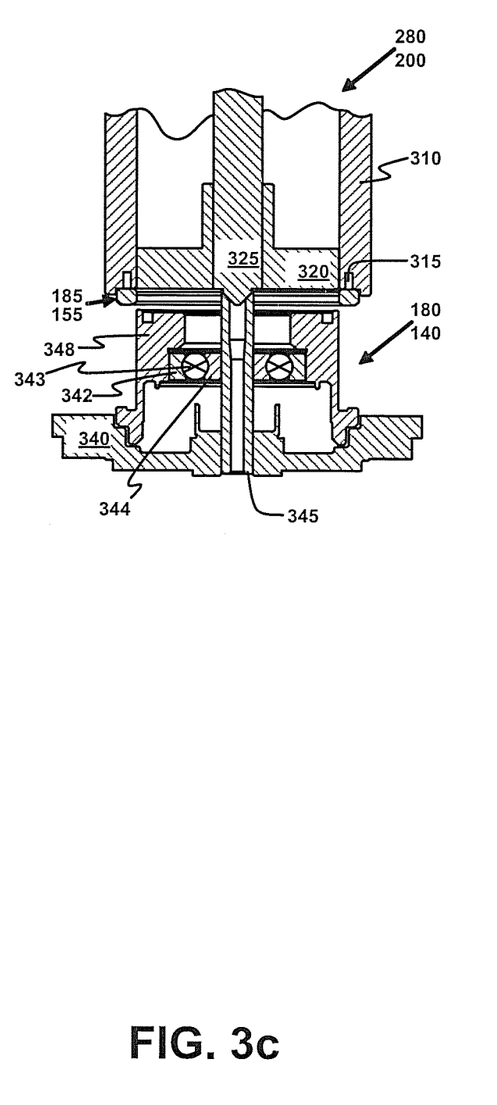

In accordance with an embodiment as shown at element 416 of process 400 and in FIG. 3C, temporarily holding the second component such as spacer ring 155, further comprises reducing atmospheric pressure within vacuum port 315 coupled to robotic end-effector 200 whereby atmospheric pressure outside vacuum port 315 presses against a surface of the second component, thereby holding the second component against robotic end-effector 200. In accordance with another embodiment as presented in FIG. 3B, temporarily holding the second component such as spacer ring 155, comprises gripping the second component with gripper 319, and biasing the second component against datum feature 313 and lateral datum feature 317.

In accordance with an embodiment as shown at element 420 of process 400, and in FIG. 3B and FIG. 3C, course alignment device 320, which is coupled with robotic end effector 200 is aligned and engaged to locating feature 147, which is coupled with the first component such as motor-hub assembly 140. In one embodiment locating feature 147 is part of motor-hub assembly 140. In another embodiment, locating feature 147 is coupled with the first component such as motor-hub assembly 140 through a processing tray wherein the processing tray comprises locating feature 147 and the first component such as motor-hub assembly 140 is accurately coupled to the processing tray.

In accordance with an embodiment as shown at element 425 of process 400, and in FIG. 3B and FIG. 3C, aligning and engaging course alignment device 320 further comprises inserting pin 325 coupled with robotic end-effector 200 into locating feature 147 coupled with the first component such as motor-hub assembly 140.

It is appreciated that the alignment provided by engaging course alignment device 320 with locating feature 147 is not sufficient by itself to achieve the alignment of a second component such as spacer ring 155 to a first component such as motor-hub assembly 140.

With reference to FIG. 3B and FIG. 3C, it is appreciated that tolerances can accumulate between the location of ID 151 of spacer ring 155 and OD 141 of motor-hub assembly 140. For example, with reference to section 180 of motor-hub assembly 140, there exists tolerances for the location of OD 141, such as: concentricity of locating feature 147 within post 345; location tolerance and perpendicularity of post 345 to motor base 340; concentricity of inner race 344 to post 345; concentricity of outer race 342 to inner race 344; size tolerance and run out of balls 343; concentricity of outer race 342 to hub 348; and the placement tolerance of motor-hub assembly 140 with respect to robotic end-effector 200.

There is a similar tolerance accumulation of ID 151 of spacer ring 155. For example, with reference to section 280 of robotic end-effector 200, and section 185 of spacer ring 155 in FIG. 3B, there exist tolerances for the location of ID 151 such as: concentricity of tapered end 327 to pin 325; concentricity and perpendicularity of pin 325 to course alignment device 320; clearance and concentricity of course alignment device 320 to holding device 310, location tolerance of lateral datum feature 317 in holding device; and clearance of lateral datum feature 317 with spacer ring 155. The placement tolerance of spacer ring 155 with a robot to which robotic end-effector 200 is coupled can be in a range of 5 to 10 microns, depending upon the robot.

The previously listed examples of tolerances that can effect the location of ID 151 with respect to OD 141 can be as much as 25 microns, which is greater than the accuracy of a robot placing spacer ring 155 having ID 151. Course alignment device 320 is aligning holding device 310 with respect to locating feature 147 and not directly aligning ID 151 of spacer ring 155 to OD 141 of motor-hub assembly 140.

Figure 3D:
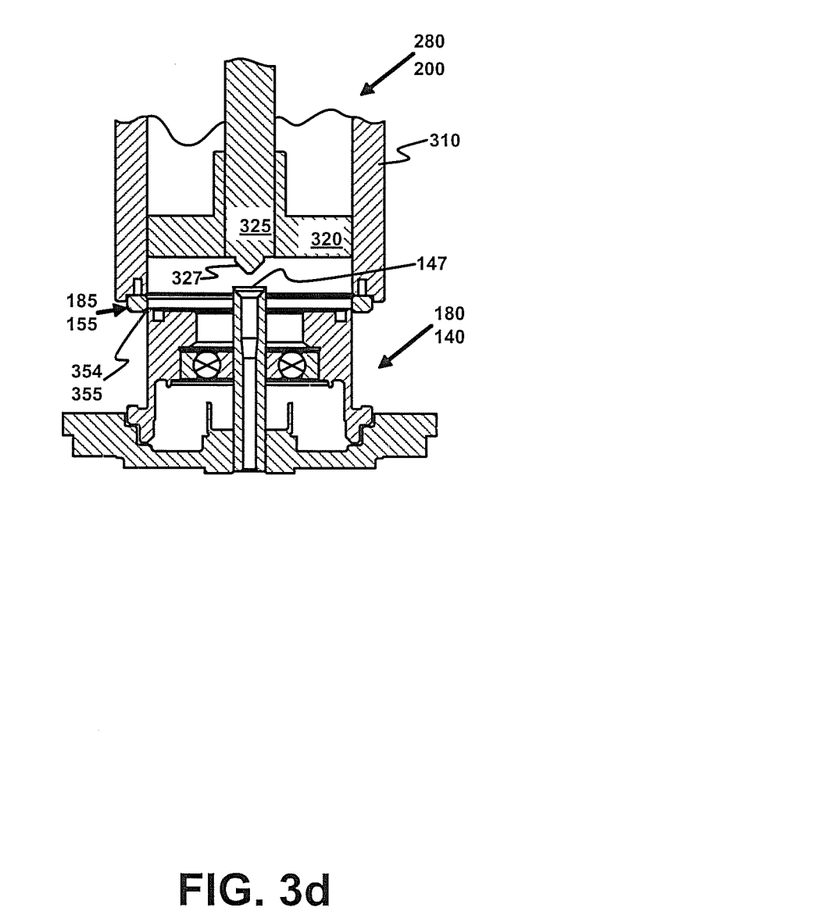

In accordance with an embodiment as shown at element 430 of process 400 and in FIG. 3D, course alignment device 320 is disengaged from locating feature 147 coupled to the first component such as motor-hub assembly 140. Course alignment device 320 comprise pin 325 having tapered end 327 which is configured to easily decouple from locating feature 147.

In accordance with an embodiment as shown at element 435 of process 400 and in FIG. 3D, disengaging course alignment device 320 from locating feature 147 comprises retracting pin 325, which is coupled with robotic end-effector 200 from locating feature 147 coupled with the first component such as motor-hub assembly 140.

Disengaging course alignment device 320 from locating feature 147 occurs upon contact of the second component with the first component. Contact occurs between the first and second components at the most distal ends of the features which are being aligned on the first and second components to be assembled. For example, a first component such as motor-hub assembly 140 has a distal end on OD 141 whereby a second component such as spacer ring 155 is received. Spacer ring 155 has an ID 151 in which OD 141 of motor-hub assembly 140 is inserted. The distal end on ID 151 is being aligned to OD 141; hence spacer ring 155 is being aligned and assembled to motor-hub assembly 140.

Figure 3E:
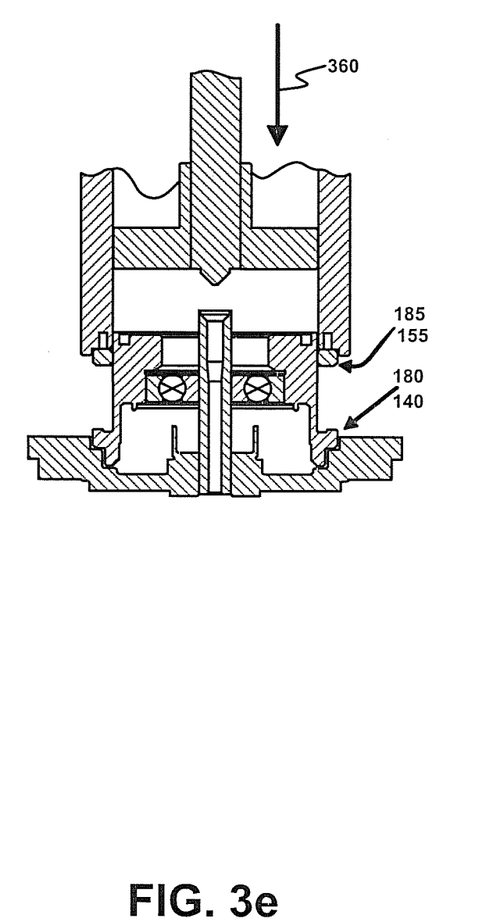

In accordance with an embodiment as shown at element 440 of process 400, and in FIG. 2 and FIG. 3D, the first component such as motor-hub assembly 140 is touched with the second component such as spacer ring 155. With reference to FIG. 3E and in accordance with an embodiment, first component such as motor-hub assembly 140 is traversed in direction 360 along the first component such as motor-hub assembly 140. Moveable base 230, which is coupled to holding device 310, enables the second component such as spacer ring 155 to move with respect to the first component such as motor-hub assembly 140. By enabling the second component to move with respect to the first component, fine alignment is enabled for aligning ID 151 of spacer ring 155 to OD 141 of motor-hub assembly 140.

Movement of the second component is enabled by moveable base 230. Movement and thus fine alignment is caused by the touching of the second component such as motor-hub assembly 140 with the second component such as spacer ring 155. Movement is caused by the misalignment and resulting interference of the second component with the first component and the second component sliding against the first component.

For example, with reference to FIG. 3A, FIG. 3B, and FIG. 3D, motor-hub assembly 140 has chamfer 355 at the most distal end of OD 141. Spacer ring 155 has a similar chamfer 355 at the most distal ends of ID 151. Chamfer (354, 355) has a typical width of 100 microns to 300 microns. A chamfer is corner break having a typical angle of approximately 45 degrees. It can be less than or greater than 45 degrees. As presented in FIG. 3D, chamfer 355 of spacer ring 155 touches chamfer 354 and proceeds in direction 360 away from chamfer 354 of motor-hub assembly 140. As presented in FIG. 3E, chamfer 355 forces chamfer 354 laterally as the angled surface of chamfer 354 aligns itself with the angled surface of chamfer 355. In so doing fine alignment of the second component, such as spacer ring 155, is enabled with the first component such as motor-hub assembly 140.

Figure 3F:
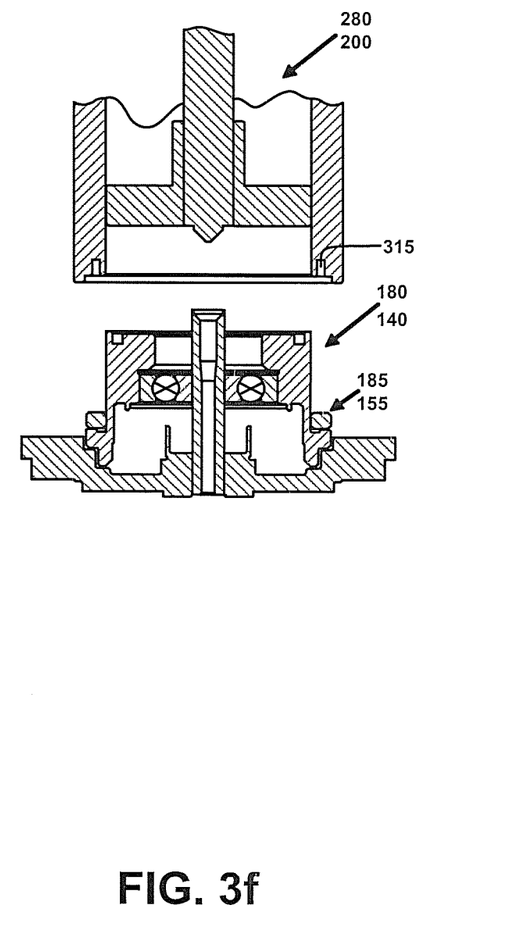

In accordance with an embodiment as shown at element 450 of process 400 and FIG. 3F, the second component such as spacer ring 155 is released from robotic end-effector 200 and enables second component such as spacer ring 155 to remain on the first component such as motor-hub assembly 140. After releasing the second component such as spacer ring 155, robotic end-effector 200 is available to align and assemble another second component such as spacer ring 155 to the first component such as motor-hub assembly 140.

In accordance with an embodiment as shown at element 455 of process 400 and FIG. 3F, releasing the second component such as spacer ring 155 from robotic end-effector 200 comprises equalizing atmospheric pressure within vacuum port 315 coupled to robotic end-effector 200 whereby atmospheric pressure inside vacuum port 315 is at least equal to atmospheric pressure outside vacuum port 315 whereby the atmospheric pressure outside vacuum port 315 ceases to press against a surface of the second component such as spacer ring 155, thereby releasing the second component from robotic end-effector 200 and enabling the second component to remain on the first component such as motor-hub assembly 140.

The present invention, in the various presented embodiments provides a robotic end-effector and method for high-speed precision alignment and assembly of components. Embodiments of the present invention enable high-speed precision alignment and assembly while avoiding the cost of a vision system and/or tactile system, which are typically required to achieve similar precision and speed of alignment and assembly that are enabled by embodiments of the present invention. Embodiments of the present invention mitigate damage of coupling surfaces during assembly and prevent problems that can arise from such damaged surfaces.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A robotic end-effector for high-speed precision alignment and assembly of a spacer ring onto a motor-hub assembly comprising:
   a vacuum holding device operable for temporarily holding said spacer ring, whereby said spacer ring is to be aligned and assembled to said motor-hub assembly, said holding device comprising a datum feature for abutting said spacer ring to said holding device;
   a course alignment device operable for locating said holding device with respect to a locating feature coupled with said motor-hub assembly;
   a refractor operable for disengaging said course alignment device from said locating feature; and
   a moveable base whereby lateral compliance is provided for said holding device, enabling motion of said spacer ring with respect to said motor-hub assembly, thereby enabling fine alignment of said spacer ring with said motor-hub assembly when said motor-hub assembly touches said spacer ring, wherein said movable base is disposed above said vacuum holding device and configured to move orthogonal to said vacuum holding device.

2. The robotic end-effector of claim 1, wherein said datum feature for abutting said spacer ring to said holding device comprises a surface approximately coincident with a circumference of said spacer ring.

3. The robotic end-effector of claim 1, wherein said holding device comprises a gripper for biasing said spacer ring against said datum feature and temporarily holding said spacer ring to said end-effector.

4. A disk stack station for a hard disk drive having a robotic end-effector for high-speed precision alignment and assembly of a spacer ring onto a motor-hub assembly comprising:
   a vacuum holding device operable for temporarily holding a spacer ring, whereby said spacer ring is to be aligned and assembled to said motor-hub assembly, said holding device comprising a datum feature for abutting said spacer ring to said holding device;
   a course alignment device operable for locating said holding device with respect to a locating feature coupled with said motor-hub assembly;
   a refractor operable for disengaging said course alignment device from said locating feature; and
   a moveable base whereby lateral compliance is provided for said holding device, enabling motion of said spacer ring with respect to said motor-hub assembly, thereby enabling fine alignment of said spacer ring with said motor-hub assembly when said spacer ring touches said motor-hub assembly, wherein said movable base is disposed above said vacuum holding device and configured to move orthogonal to said vacuum holding device.

5. The robotic end-effector of claim 4, wherein said datum feature for abutting said spacer ring to said holding device comprises a surface approximately coincident with a circumference of said spacer ring.

6. The robotic end-effector of claim 4, wherein said holding device comprises a gripper for biasing said spacer ring against said datum feature and temporarily holding said spacer ring to said end-effector.

* * * * *

UNITED STATES PATENT AND TRADEMARK OFFICE
CERTIFICATE OF CORRECTION

PATENT NO. : 8,458,896 B2
APPLICATION NO. : 12/277762
DATED : June 11, 2013
INVENTOR(S) : Nagappan Chandrasekaran et al.

It is certified that error appears in the above-identified patent and that said Letters Patent is hereby corrected as shown below:

On the Title Page, Item (57)
ABSTRACT: Delete: "A robotic end-effector for high-speed precision alignment and assembly of of a spacer ring onto a motor-hub assembly has a holding device operable for temporarily holding the spacer ring. The spacer ring is to be aligned and assembled to the motor-hub assembly. The robotic end-effector has a course alignment device operable for locating the holding device with respect to a locating feature that is coupled with the motor-hub assembly. The robotic end-effector has a retractor operable for disengaging the course alignment device from the locating feature. The robotic end-effector has a moveable base whereby lateral compliance is provided for the holding device, enabling motion of the spacer ring with respect to the motor-hub assembly, thereby enabling fine alignment of the spacer ring with the motor-hub assembly when the spacer ring touches the motor-hub assembly."

Insert: --A robotic end-effector for high-speed precision alignment and assembly of a spacer ring onto a motor-hub assembly has a holding device operable for temporarily holding the spacer ring. The spacer ring is to be aligned and assembled to the motor-hub assembly. The robotic end-effector has a course alignment device operable for locating the holding device with respect to a locating feature that is coupled with the motor-hub assembly. The robotic end-effector has a retractor operable for disengaging the course alignment device from the locating feature. The robotic end-effector has a moveable base whereby lateral compliance is provided for the holding device, enabling motion of the spacer ring with respect to the motor-hub assembly, thereby enabling fine alignment of the spacer ring with the motor-hub assembly when the spacer ring touches the motor-hub assembly.--

In the Claims
Col. 9, Claim 1, Line 33, Delete: "refractor"
　　　　　　　　　　　　　Insert: --retractor--

Col. 10, Claim 4, Line 22, Delete: "refractor"
　　　　　　　　　　　　　 Insert: --retractor--

Signed and Sealed this
Eighteenth Day of February, 2014

Michelle K. Lee
*Deputy Director of the United States Patent and Trademark Office*